(12) United States Patent
Balachandran et al.

(10) Patent No.: US 7,068,619 B2
(45) Date of Patent: Jun. 27, 2006

(54) RADIO LINK CONTROL WITH LIMITED RETRANSMISSIONS FOR STREAMING SERVICES

(75) Inventors: Krishna Balachandran, Middletown, NJ (US); Kirk K. Chang, Morganville, NJ (US); Richard Paul Ejzak, Wheaton, IL (US); Wei Luo, Eatontown, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 766 days.

(21) Appl. No.: 09/847,567

(22) Filed: May 2, 2001

(65) Prior Publication Data

US 2002/0019232 A1    Feb. 14, 2002

Related U.S. Application Data

(60) Provisional application No. 60/223,418, filed on Aug. 7, 2000.

(51) Int. Cl.
*H04Q 7/00*    (2006.01)

(52) U.S. Cl. ................ 370/328; 370/465; 370/473; 714/748

(58) Field of Classification Search .............. 370/473, 370/328; 714/748, 749
See application file for complete search history.

(56) References Cited

U.S. PATENT DOCUMENTS

| 5,918,002 | A | 6/1999 | Klemets et al. | |
|---|---|---|---|---|
| 6,085,252 | A | 7/2000 | Zhu et al. | |
| 6,259,677 | B1 * | 7/2001 | Jain | 370/252 |
| 6,473,399 | B1 * | 10/2002 | Johansson et al. | 370/229 |
| 6,567,375 | B1 * | 5/2003 | Balachandran et al. | 370/204 |
| 6,601,207 | B1 * | 7/2003 | Vanttinen | 714/748 |
| 6,693,921 | B1 * | 2/2004 | Whitfield | 370/516 |
| 6,704,898 | B1 * | 3/2004 | Furuskar et al. | 714/751 |
| 6,735,192 | B1 * | 5/2004 | Fried et al. | 370/352 |
| 6,757,245 | B1 * | 6/2004 | Kuusinen et al. | 370/230 |
| 6,804,202 | B1 * | 10/2004 | Hwang | 370/282 |
| 6,895,057 | B1 * | 5/2005 | Balachandran et al. | 375/259 |
| 2002/0054578 | A1 * | 5/2002 | Zhang et al. | 370/328 |
| 2004/0120253 | A1 * | 6/2004 | Forssell et al. | 370/230 |

OTHER PUBLICATIONS

Balachandran et al., "Efficient Transmission of ARQ Feedback for EGPRS Radio Link Control", IEEE Communications, 1999, pp. 1663-1664.*
Balachandran et al., "A Proposal for EGPRS Radio Link Control Using Link Adaptation and Incremental Redundancy", Bell Labs Technical Journal, Jul.-Sep. 1999, pp. 19-36.*

* cited by examiner

*Primary Examiner*—Seema S. Rao
*Assistant Examiner*—Michael J. Moore

(57) ABSTRACT

In a mobile station-mobile receiver arrangement a method and apparatus for a radio link control (RLC) protocol that allows partial recovery of data for streaming services. The maximum number of retransmissions allowed by the method for each RLC block is a function of the maximum delivery delay required by the streaming service and the round trip delay.

23 Claims, 2 Drawing Sheets

RADIO LINK CONTROL WITH LIMITED RETRANSMISSIONS FOR STREAMING SERVICES

CROSS-REFERENCE TO RELATED APPLICATION

This application claims priority of Provisional Application Ser. No. 60/223,418 which was filed Aug. 7, 2000.

FIELD OF THE INVENTION

The present invention relates generally to wireless communication networks and, in particular, to a method for efficiently providing streaming services over wireless and cellular networks.

BACKGROUND OF THE INVENTION

The widespread growing popularity of the Internet has encouraged wireless communication system developers to continually improve the data communication capabilities of their systems. In response to this need, various standards bodies are formulating new third generation (3G) standards which support higher data rates. For example, standards organizations such as the European Telecommunications Standards Institute (ETSI), the Association of Radio Industries and Broadcasting (ARIB) and the Telecommunications Industry Association (TIA) are continually working to develop standards to support faster and more efficient wireless communications.

Consequently, the wireless communications industry is developing and implementing new wireless transmission protocols, which provide faster, more robust and more efficient data communications over an air interface. For example, general packet radio service (GPRS) has been developed as a packet-switched upgrade for the well known time division multiple access (TDMA) system. In a further advancement in the art, enhanced GPRS (EGPRS) has also been developed.

In wireless packet data systems such as Enhanced General Packet Radio Service (EGPRS), selective automatic repeat request (ARQ) is used for error recovery over the radio link. Currently, nine Modulation and Coding Schemes (MCSs) have been proposed for EGPRS with MCS-1 being the most robust and MCS-9 being the least robust scheme. The Radio Link Control (RLC) layer allows full recovery (i.e, there is no limit on the maximum number of retransmissions) and delivers data in-sequence to the higher layer. It does not guarantee a delivery rate or a maximum delivery delay. This scheme is best suited to the support of best effort data services over wireless links, and not to applications such as streaming.

For voice services, the loss and delay requirements are typically very stringent and do not allow sufficient time for any error recovery. Furthermore, with the advances in speech coding, the rates demanded by voice services are quite low (<12–16 kb/s). Therefore, the typical approach is to transmit enough redundant information to allow operation under poor channel conditions. The channel coding is fixed and no retransmissions are allowed. This approach is also not well suited to streaming services since the delay requirements for streaming are typically more relaxed than packet voice. As a result, it is not necessary to limit the achievable efficiency by using a fixed amount of redundancy, independent of the actual delay requirements and the prevailing channel quality. Higher streaming rates can be supported if error recovery is carried out using a selective ARQ process with limited retransmission capability.

A streaming service places the following requirements on the radio link control (RLC) protocol: play out rate (R) at receiver RLC; maximum delivery delay (D) where the delivery delay is defined as the time between arrival of data at the transmitter RLC and play out by the receiver RLC to the higher layer; and maximum residual loss rate, L. EGPRS R1999 Radio Link Control (RLC) block segmentation and retransmission procedures have already been specified by ETSI GSM 04.60 R1999, entitled "General Packet Radio Service (GPRS); Mobile Station—Base Station Interface; Radio Link Control/Medium Access Control (RLC/MAC) protocol"; in order to allow: dynamic link adaptation between nine different coding and modulation schemes (MCS-1 to MCS-9) to achieve the best delay/throughput tradeoff under prevailing channel conditions; and incremental Redundancy (IR) operation where the amount of redundant information sent with the initial transmission or subsequent retransmissions of an RLC block depends on the prevailing MCS. ETSI GSM 04.60 R1999, entitled "General Packet Radio Service (GPRS); Mobile Station—Base Station Interface; Radio Link Control/Medium Access Control (RLC/MAC) protocol." is hereby incorporated by reference. Also, EGPRS R1999 Radio Link Control specification is incorporated by reference.

EGPRS R1999 does not support streaming services efficiently and it is difficult for it to provide the streaming requirements described above. It is desirable to provide a method and apparatus for radio link control that satisfies the above streaming requirements.

SUMMARY OF THE INVENTION

Briefly stated in accordance with one aspect of the invention, the aforementioned problem is addressed and an advance in the art achieved by providing a method and apparatus for a radio link control (RLC) protocol that allows partial recovery for streaming services. The method and apparatus use the step of determining a play out time for each RLC block as a function of block size, play out rate and allowed delay for each transmission. Next, is a step of aborting recovery for a RLC block, if the RLC block is not received by a respective play out time thereof. Next is the step of receiving and recovering said RLC block that is received by the respective play out time thereof.

In accordance with a specific embodiment of the invention, the aforementioned problem is addressed by a transmitter RLC simultaneously transmitting $m_1$ copies at the initial transmission of an RLC block. These copies are derived from the coded block through different puncturing. At each subsequent retransmission, a number of copies ($m_2$, $m_3$, . . . ) of the RLC block are transmitted. The number of copies, $m_1$ $m_2$, $m_3$, . . . is selected to maximize the streaming rate under loss and delay constraints. This method and protocol also minimizes the channel occupancy. The copies are selected by cycling through the puncturing schemes, P1, P2 and P3 so that the redundant information provided has minimal overlap with previous transmissions. This improves performance when a corresponding receiver has the ability to store and combine soft information (i.e., if incremental redundancy (IR) operation is possible). If the amount of new data available to the transmitter RLC is less than the total number of bits that can fit into the space within a Radio Block, then there are 2 possible options: The transmitter RLC can wait till enough data becomes available. This reduces the channel occupancy. Alternatively, the transmitter RLC can use a more robust modulation and coding scheme. The transmitter RLC may provide a play out reference to the receiver RLC by adding a UTR (Update Time Reference) bit to the RLC/MAC header. At each initial transmission of an RLC block, the transmitter RLC may set UTR=1 if the block sees a short (or no) queuing delay since these blocks will reflect the true RLC transmitter time reference to the RLC receiver.

In accordance with a specific embodiment of the invention, the aforementioned problem is addressed by a receiver RLC that establishes a play out time, p, for the delivery of the data contained in each RLC block to the higher layer. The play out time is determined with respect to a rolling time reference, $\tau$. The play out time for RLC block with sequence number, n, is set to $p(n)=\tau(k)+D+[(n-k) \bmod N]*(B/R)$, where R is the play out rate (in kbps), D is the delay budget in seconds, B is the amount of data contained in each RLC block (in kbits), N is the size of the sequence number space, $\tau(k)$ is the time of receipt of the first header with sequence number k, or a header with UTR=1 and sequence number k if the UTR bit is used. The receiver may alternately use a moving average value of $\tau(k)$. Initialization is carried out by setting $\tau(0)$ as the time of receipt of a header indicating the transmission of the first RLC block, and $p(0)=\tau(0)+D$. When an RLC block is not received at least one round trip delay, T, prior to the play out time, then its receipt status is set to '1' (acknowledged). This means that it will be acknowledged the next time the receiver is polled for feedback and the transmitter will not attempt further recovery for the block. If the RLC block is not received by the play out time, the receiver RLC indicates a loss to the higher layer. When the RLC block is received (i.e., decoded successfully) by the corresponding play out time, then it is provided to the higher layer at the play out time.

BRIEF DESCRIPTION OF THE DRAWINGS

The above features and advantages of the present invention will become apparent from the ensuing description of several preferred exemplary embodiments, which should be read in conjunction with the accompanying drawings, in which.

DETAILED DESCRIPTION OF THE INVENTION

Figure 1:
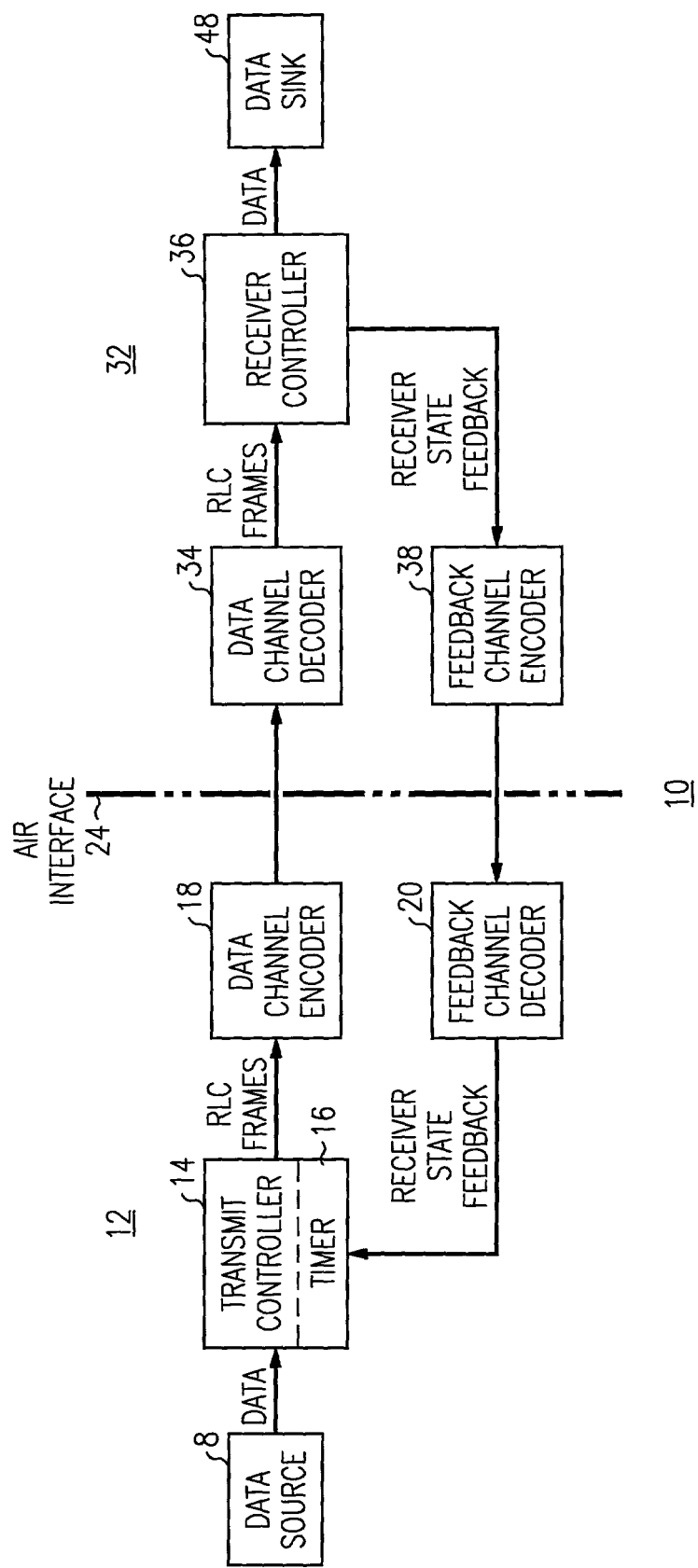
FIG. 1 is a block diagram depicting a transmitter-receiver arrangement according to the present invention.

Referring now to FIG. 1, a transmitter-air-receiver arrangement 10 is shown. The arrangement 10 has a transmitter 12 and a receiver 32 separated by an air interface 24. Air interface 24 is preferred, but any transmission media could be used. The invention provides radio link control with limited retransmissions for streaming data from data source 8 to data sink 48. Streaming data has different requirements than non-streaming data. However, to some extent it is possible to reuse EGPRS R1999 RLC/MAC block formats, modulation and coding schemes (MCS), and retransmission procedures. Some enhancements to current retransmission procedures are needed, though, in order to satisfy all aspects of the above streaming requirements. In the following description of a preferred embodiment, these enhancements are described and simulation results are provided that indicate the streaming rates that can be supported by each particular streaming data process.

The physical layer described in EGPRS R1999 offers a choice of modulation and coding schemes whose link performance is a function of the channel quality. However, EGPRS R1999 does not specify any limit on the number of retransmissions since it is intended primarily to support a best effort data service. According to one embodiment of the present invention, for a particular choice of MCS, a limited retransmission scheme may be defined as follows. Given the maximum delivery delay (D), and the round trip delay (T), it is possible to allow the ratio D/T round-trips at the RLC layer before the delay budget is exceeded. This delay ratio places a limit on the maximum number of retransmissions allowed for each RLC block. The RLC procedures required at the transmitter and receiver to implement the invention are described in greater detail below.

Transmitter RLC Operation

At the initial transmission of an RLC block, $m_1$ copies are simultaneously transmitted from transmitter 12. Note that multiple copies of the block are not identical, but are derived from the coded block through different puncturing schemes (P1/P2/P3 for MCS-4, MCS-7 to MCS-9, and P1/P2 for MCS-5, MCS-6, MCS1 to MCS-3). At the initial transmission of each RLC block, a timer 16 is started. An RLC block can be retransmitted only if the timer corresponding to that block expires and the block is negatively acknowledged. The per-block timers and retransmission procedure in this particular case are identical to the EGPRS R1999 RLC procedure. The network, generically represented as data source 8, polls the mobile station, represented by transmitter 12, for ARQ bitmap feedback. The polling period is determined by the network in response to the ARQ bitmap feedback.

At each subsequent retransmission, a number of copies $(m_2, m_3, \ldots)$ of the RLC block are transmitted. The copies are chosen by cycling through the puncturing schemes, P1, P2 and P3 so that the redundant information provided has minimal overlap with previous transmissions. This improves performance when the receiver has the ability to store and combine soft information (i.e., if IR operation is possible). Depending on the choice of m1, m2, . . . , multiple realizations that satisfy the desired requirements are possible. It is desirable to choose the realization that maximizes the achieved streaming rate. This also minimizes the channel occupancy and allows other applications from the same user or applications from other users to share the channel. It is worth noting that the operation of transmitter RLC 14 is identical to EGPRS R1999 transmitter operation until retransmission limits are exceeded.

If the amount of new data available to a transmitter RLC 14 is less than the total number of bits that can fit into the space within a Radio Block, then there are 2 possible options: 1) the transmitter RLC 14 can wait till enough data becomes available. This option reduces the channel occupancy rate; and 2) alternatively, the transmitter RLC 14 can use a more robust modulation and coding scheme. For a particular loss and delay requirement, the streaming rates that can be supported by each of these two options depend on the prevailing channel conditions.

Figure 2:
FIG. 2 is a diagram of a RLC frame of data according to the present invention.

New data may not be provided at a constant rate to the transmitter RLC 14 since jitter and losses occur over the IP network (e.g. data source 8). When there are variations in the data interarrival time at the transmitter RLC 14 on account of jitter in the network, the RLC receiver 32 is informed so that it may update its play out time reference. This ensures that all RLC blocks are provided with the same number of retransmission opportunities, as permitted by the delay budget. Time reference adjustment may be carried out by adding a UTR (Update Time Reference) bit to the RLC/MAC header. One of the spare bits available in the RLC/MAC header may be used for this purpose (see FIG. 2). At each initial transmission of an RLC block, the transmitter RLC 14 may set UTR=1. The transmitter 12 should set UTR=1 only for blocks that see a short (or no) queuing delay at the transmitter RLC since these blocks will reflect the true RLC transmitter time reference to the RLC receiver 36. In the case when multiple copies are transmitted initially, UTR is set to 1 in the header corresponding to the first copy. The transmitter RLC 14 then sets UTR=0 for all retransmissions. The corresponding receiver update procedures are described later in the receiver description. Alternatively, the receiver 32 may derive the time reference digitally without using the UTR bit as described the receiver description.

Receiver RLC Operation

The receiver RLC 36 is responsible for in-sequence delivery of data within the delay budget, D. It also has to meet certain data play out rates and loss requirements. These requirements demand more complex procedures than EGPRS R1999 and ETSI GSM 04.60 R1999, "General Packet Radio Service (GPRS); Mobile Station—Base Station Interface; Radio Link Control/Medium Access Control (RLC/MAC) protocol." The more complex procedures are described below.

The receiver RLC establishes a play out time, p, for the delivery of the data contained in each RLC block to a higher layer (e.g. data sink 48). The play out time is determined with respect to a rolling time reference. The play out time for a RLC block with sequence number, n, is set to $$p(n)=\tau(k)+D+[(n-k) \bmod N]*(B/R), \text{ where}$$

R is the play out rate (in kbps),

D is the delay budget in seconds,

B is the amount of data contained in each RLC block (in kbits),

N is the size of the sequence number space, $\tau(k)$ is the time of receipt of the first header with sequence number k, or a header with UTR=1 and sequence number k if the UTR bit is used. The receiver may alternately use a moving average value of $\tau(k)$ determined as described in the next paragraph.

If the UTR bit is not used, $\tau(k)$ is the earliest receipt time of a series of headers with sequence number m, m+1, ..., m+j, and k is the corresponding sequence number. Initialization is carried out by setting $\tau(0)$ as the time of receipt of a header indicating the transmission of the first RLC block, and $p(0)=\tau(0)+D$. If an RLC block is not received at least one round trip delay, T, prior to the play out time, then its receipt status is set to '1' (i.e. acknowledged). This means that it will be acknowledged the next time the receiver is polled for feedback and the transmitter will not attempt further recovery for the block. If the RLC block is not received by the play out time, the receiver RLC indicates a loss to the higher layer. If the RLC block is received (i.e., decoded successfully) by the corresponding play out time, then it is provided to the higher layer at the play out time.

System Operation

Simulations were carried out to determine the performance of the proposed RLC for streaming applications. The assumptions used in the simulations were as follows:

Single slot simulation

Periodic arrivals of data at the transmitter RLC 14 (every 80 ms)

Play out rate at receiver RLC 36 is assumed to be equal to the arrival rate of data at the transmitter RLC MCS-9 (P1 sent on initial transmission, P2 on first retransmission, P3 on second retransmission, . . . )

0.5 seconds delay budget

Channel Model: TU3, ideal frequency hopping 80 ms Round Trip Delay 60 ms Polling Period Window size=192

IR soft combining assumed (memory size limited to soft information for 40 RLC blocks)

Figure 3:
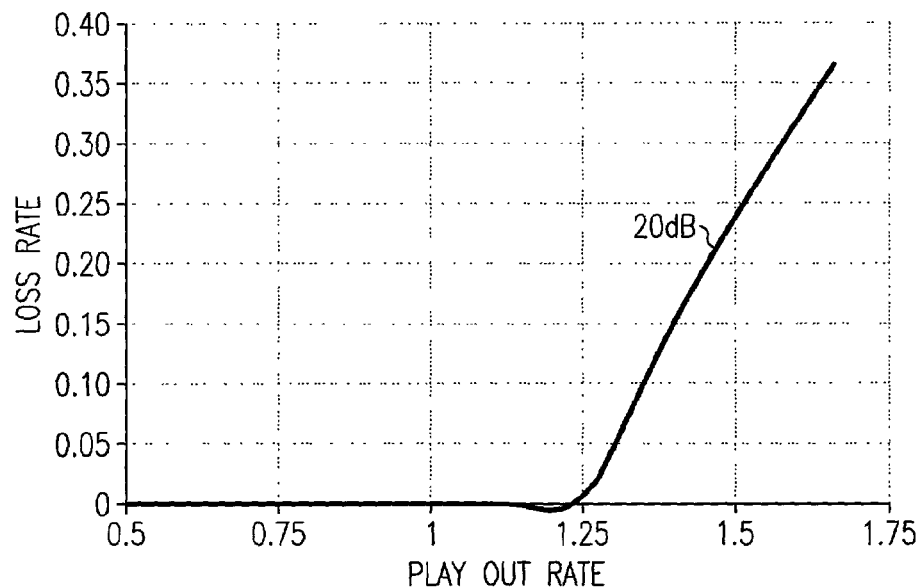
FIG. 3 is a plot of simulated loss rate of data versus data play out rate according to the present invention.
Figure 4:
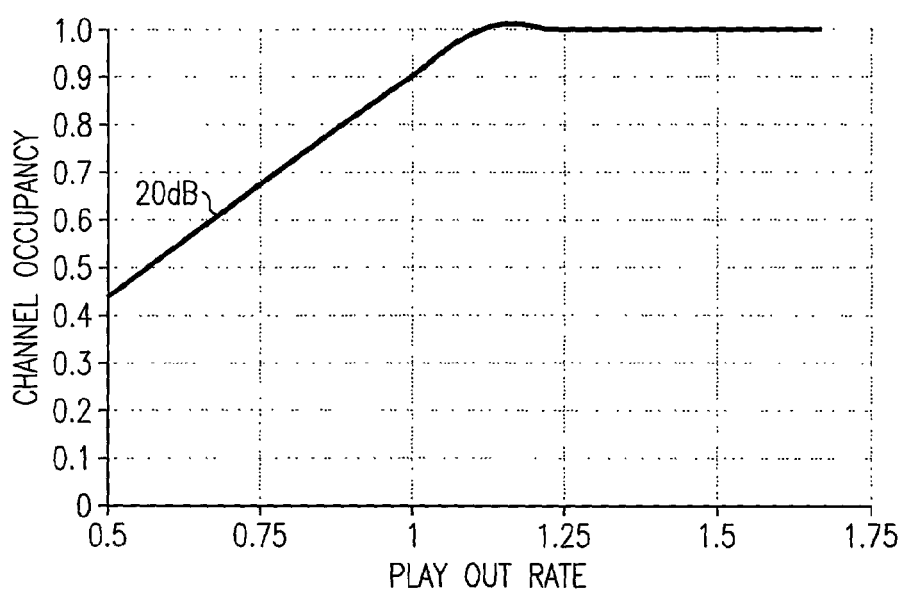
FIG. 4 is a plot of simulated channel occupancy versus data play out rate according to the present invention.

The results for loss rate and channel occupancy are shown for C/I=20 dB in FIGS. 3 and 4, respectively. According to the preferred embodiment of the invention, a streaming rate of 1.25 RLC blocks per 20 ms period (i.e., 37 kbps) can be supported at a loss rate of 0.7%. Further, with fixed coding, a loss rate of 0.7% only allows a maximum streaming rate of around 30 kbps.

From the foregoing, it should be readily ascertained that the invention is not limited by the embodiments described above which are presented as examples only but may be modified in various ways within the intended scope of protection as defined by the appended patent claims.

What is claimed is:

1. A method for a radio link control (RLC) protocol that allows at least partial recovery of a streaming service over a wireless communication channel, comprising the steps of:
   determining a play out time for each RLC block as a function of block size, play out rate and allowed delay for each transmission;
   aborting recovery for a RLC block if said RLC block is not received by a respective play out time thereof; and
   receiving and recovering said RLC block that is received by the respective play out time thereof.

2. The method of claim 1, wherein at a receiver said play out time for a RLC block of sequence number n is given by:

$$p(n)=\tau(k)+D+[(n-k) \bmod N]*(B/R), \text{ where}$$

R is a play out rate (in kbps),

D is a delay budget in seconds,

B is an amount of data contained in each RLC block (in kbits),

N is a size of the sequence number space, $\tau(k)$ is a time of receipt of a first header with sequence number k.

3. The method of claim 1, wherein a receiver receiving RLC blocks acknowledges RLC blocks that are not received by the play out time.

4. The method of claim 1, further comprising the step of:
   at an initial transmission of an RLC block, transmitting a first plurality of copies, which are derived from the RLC block through different puncturings thereof; and
   at each subsequent retransmission, transmitting a second plurality of copies of the RLC block wherein a number of copies of said second plurality of copies is selected to maximize a streaming rate under loss and delay constraints.

5. The method of claim 4, wherein the number of copies of said second plurality of copies is also selected to minimize channel occupancy.

6. The method of claim 5, wherein copies are selected by cycling through puncturings, P1, P2 and P3 such that redundant information provided has minimal overlap with previous transmissions to improve performance when said receiver can store and combine this information.

7. The method of claim 6, wherein if an amount of new data available to an RLC of the transmitter is less than a total number of bits that can fit into a space within a RLC block of data, then the RLC of the transmitter waits until enough data becomes available even though this reduces channel occupancy.

8. The method of claim 6, wherein if an amount of new data available to an RLC of the transmitter is less than a total number of bits that can fit into a space within a RLC block of data, then the RLC of the transmitter uses more robust modulation and coding.

9. The method of claim 8, wherein said RLC of the transmitter provides a play out time reference to an RLC of the receiver by adding an update time reference (UTR) bit to an RLC/MAC header and to each initial transmission of an RLC block.

10. The method of claim 9 wherein the RLC of the transmitter sets UTR equal to one and the RLC block experiences a short queuing delay.

11. The method of claim 8, wherein:
the receiver RLC establishes a play out time, p, for the delivery of the data contained in each RLC block to the higher layer; said play out time being determined with respect to a rolling time reference and said play out time for a RLC block with sequence number, n, is set to $p(n)=\tau(k)+D+[(n-k) \mod N]*(B/R)$, with R being the play out rate (in kbps), D being the delay budget in seconds, B being the amount of data contained in each RLC block (in kbits), N being the size of the sequence number space,
$\tau(k)$ being a time of receipt of the first header with sequence number k, or a header with UTR=1 and sequence number k if the UTR bit is used.

12. The method of claim 8, wherein:
the receiver RLC establishes a play out time, p, for the delivery of the data contained in each RLC block to the higher layer; said play out time being determined with respect to a rolling time reference and said play out time for a RLC block with sequence number, n, is set to $p(n)=\tau(k)+D+[(n-k) \mod N]*(B/R)$, with R being the play out rate (in kbps), D being the delay budget in seconds, B being the amount of data contained in each RLC block (in kbits), N being the size of the sequence number space,
$\tau(k)$ being a time of receipt of the first header with sequence number k, with the receiver using a moving average value of $\tau(k)$.

13. A method for a radio link control (RLC) protocol for at least partial recovery of lost or corrupted data in a streaming data based service for use in wireless telephony, comprising the steps of:
determining a maximum number of retransmissions for each RLC block of data from a maximum delivery delay of the service and a round trip delay between two wireless stations;
during an initial transmission of a first RLC block of data, transmitting a first plurality of copies of said RLC block of data; said copies are not identical since each of said plurality of copies is derived from a different puncturing of said RLC block of data; and
during each subsequent retransmission, transmitting a second plurality of copies of said RLC block of data such that said second plurality of copies is selected to maximize a streaming data rate within data loss and data delay constraints;
wherein said RLC of the transmitter provides a play out time reference to an RLC of the receiver by adding an update time reference (UTR) bit to an RLC/MAC header and to each initial transmission of an RLC block.

14. The method of claim 13, further comprising the step of during each subsequent retransmission, transmitting a second plurality of copies of said RLC block of data such that said second plurality of copies is selected to also minimize channel occupancy.

15. The method of claim 14, wherein all said copies are selected by cycling through three puncturings of said RLC block of data such that each punctured copy of the block of data has minimal overlap with other punctured copies of the same RLC block of data transmitted previously.

16. The method of claim 15, wherein a receiving station stores and combines said copies with different puncturings to provide correction of errors of corruption or loss in said previous transmission.

17. The method of claim 16 wherein the RLC of the transmitter sets UTR equal to one and the RLC block experiences a short queuing delay.

18. The method of claim 17, wherein the receiver RLC establishes a play out time, p, for the delivery of the data contained in each RLC block to the higher layer; said play out time being determined with respect to a rolling time reference and said play out time for a RLC block with sequence number, n, is set to $p(n)=\tau(k)+D+[(n-k) \mod N]*(B/R)$, with R being the play out rate (in kbps), D being the delay budget in seconds, B being the amount of data contained in each RLC block (in kbits), N being the size of the sequence number space, $\tau(k)$ being a time of receipt of the first header with sequence number k, or a header with UTR=1 and sequence number k if the UTR bit is used.

19. The method of claim 17, wherein the receiver RLC establishes a play out time, p, for the delivery of the data contained in each RLC block to the higher layer; said play out time being determined with respect to a rolling time reference and said play out time for a RLC block with sequence number, n, is set to $p(n)=\tau(k)+D+[(n-k) \mod N]*(B/R)$, with R being the play out rate (in kbps), D being the delay budget in seconds, B being the amount of data contained in each RLC block (in kbits), N being the size of the sequence number space, $\tau(k)$ being a time of receipt of the first header with sequence number k, with a receiver using a moving avenge value of $\tau(k)$.

20. The method of claim 16, wherein if an amount of new data available to an RLC of the transmitter is less than a total number of bits that can fit into a space within a RLC block of data, then the RLC of the transmitter waits until enough data becomes available even though this reduces channel occupancy.

21. The method of claim 20, wherein the receiver RLC establishes a play out time, p, for the delivery of the data contained in each RLC block to the higher layer; said play out time being determined with respect to a rolling time reference and said play out time for a RLC block with sequence number, n, is set to $p(n)=\tau(k)+D+[(n-k) \mod N]*(B/R)$, with R being the play out rate (in kbps), D being the delay budget in seconds, B being the amount of data contained in each RLC block (in kbits), N being the size of the sequence number space, τ(k) being a time of receipt of the first header with sequence number k, or a header with UTR=1 and sequence number k if the UTR bit is used.

22. The method of claim 1 wherein the step of determining a play out time is performed at an RLC receiver, play out time being a time at which information contained in the RLC block is to be transmitted from the RLC receiver to another destination.

23. The method of claim 1 wherein the step of aborting recovery is performed at an RLC receiver and includes the step of generating a signal for transmission to an RLC transmitter that originated the RLC block, where the signal indicates that no further retransmission attempts of the RLC block is to be made by the RLC transmitter.

* * * * *